United States Patent
Ballantine et al.

(10) Patent No.: US 6,250,803 B1
(45) Date of Patent: Jun. 26, 2001

(54) METHOD FOR TEMPERATURE MEASUREMENT USING DOPANT SEGREGATION INTO TITANIUM SILICIDE

(75) Inventors: Arne W. Ballantine, South Burlington; Glen L. Miles, Essex Junction, both of VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/327,726

(22) Filed: Jun. 8, 1999

(51) Int. Cl.[7] .................................................. G01K 7/16
(52) U.S. Cl. ........................................ 374/183; 374/185
(58) Field of Search ...................................... 374/183, 185

(56) References Cited

U.S. PATENT DOCUMENTS

| | | |
|---|---|---|
| 4,764,026 | 8/1988 | Powell et al. . |
| 5,236,865 | 8/1993 | Sandhu et al. . |
| 5,409,853 | 4/1995 | Yu . |
| 5,435,646 * | 7/1995 | McArthur et al. .................... 374/185 |
| 5,436,494 | 7/1995 | Moslehi . |
| 5,474,619 | 12/1995 | Kreider . |
| 5,567,977 | 10/1996 | Jimenez . |

* cited by examiner

Primary Examiner—Diego Gutierrez
Assistant Examiner—Madeline Gonzalez
(74) Attorney, Agent, or Firm—Wood, Phillips, VanSanten, Clark & Mortimer

(57) ABSTRACT

A method of measuring temperature of momentary anneals in the temperature range of around 900° C. is disclosed. The method comprises the steps of providing a substrate of doped polysilicon or single crystal silicon, applying a blocking layer on a portion of the substrate, selectively forming silicide on the substrate adjacent opposite ends of the blocking layer to define a resistor, subjecting the resistor to a momentary anneal in the temperature range around 900° C., and measuring interfacial resistance between the silicide and the substrate after the annealing step, the resistance correlating to anneal temperature.

16 Claims, 2 Drawing Sheets

METHOD FOR TEMPERATURE MEASUREMENT USING DOPANT SEGREGATION INTO TITANIUM SILICIDE

FIELD OF THE INVENTION

The present invention relates to measurement of temperature of rapid thermal processes and, more particularly, to a method using dopant segregation into titanium silicide.

BACKGROUND OF THE INVENTION

The production of semiconductor devices typically consists of forming or depositing a material on a substrate such as doped silicon. Typically, the processing requires annealing. The annealing can be performed as an equilibrium process in which an oven reaches the same temperature throughout, or a non-equilibrium process where the oven chamber is not itself heated. One example of a non-equilibrium process is a rapid thermal anneal (RTA), which can use high intensity lamps directed at a semiconductor wafer. With an equilibrium process, temperature measurement can be straight forward as the chamber temperature can be directly controlled, and is equal to the wafer temperature. With a non-equilibrium process it is generally necessary to use an indirect method of temperature control.

In order for such manufacturing processes to operate successfully, it is necessary to ensure that the annealing is performed at proper temperature. This is traditionally done through calibration of the annealing process. Various calibration methods have been used. However, no acceptable monitor has existed for measuring the temperature anneals such as the momentary titanium silicide transformation anneal, which ramps up to approximately 900° C., then immediately ramps back down. This anneal is important for controlling silicide resistance and certain device parameters such as P-FET polysilicon depletion. Currently, a rough attempt to match tools can be made using boron implanted wafers. This method, however, lacks the resolution required to carefully match RTA tools or monitor the process for shifts over time.

The present invention is directed to overcoming the problems discussed above in a novel and simple manner.

SUMMARY OF THE INVENTION

In accordance with the invention there is described a method of measuring temperature of momentary anneals using dopant segregation into titanium silicide.

Broadly, there is disclosed herein a method of measuring temperature of momentary anneals in a temperature range around 900° C. The method comprises the steps of providing a substrate of doped polysilicon or single crystal silicon, applying a blocking layer on a portion of the substrate, forming a silicide selectively on the unblocked regions of the substrate adjacent opposite ends of the blocking layer to define a resistor, subjecting the resistor to a momentary anneal in the temperature range around 900° C., and measuring interfacial resistance between the silicide and the substrate after the annealing step, the resistance being correlated to the anneal temperature.

It is a feature of the invention that the blocking layer step comprises applying a layer of silicon nitride, or other suitable dielectric material.

It is another feature of the invention that the substrate is doped with boron.

It is a further feature of the invention that the measuring step comprises measuring resistance between the silicide and the substrate. This measurement neglects resistance of the silicide and substrate per se.

It is still a further feature of the invention that the measuring step comprises measuring resistance using scaling resistors.

There is disclosed in accordance with another aspect of the invention a method of measuring temperature of RTA anneals in the temperature range around 900° C. The method comprises the steps of providing a substrate of doped polysilicon or single crystal silicon, applying a blocking layer on the substrate, forming silicide selectively on the substrate adjacent opposite ends of the blocking layer to define a resistor, subjecting the resistor to a momentary anneal in the temperature range around 900° C., securing electrical conductors on the silicide, and measuring interfacial resistance between the silicide and the substrate after the annealing step, the resistance being correlated to the anneal temperature.

Additionally, the use of the present invention can be extended beyond the calibration of RTA processors which operate at approximately 900° C. State of the art equipment used to conduct RTA processing is usually calibrated at only one temperature using a monitor. The operation of the system over its full range of capability, typically 400° C. to 1200° C., is based on the accuracy of that one calibration point. When the present invention utilized to conduct a single-point calibration of very high accuracy at a temperature near 900° C., the quality of the calibration of the system over the entire operating range is significantly improved. Thus, while the present invention operates near the temperature of 900° C., its effectiveness extends throughout the operating range of rapid thermal annealing systems.

Further, semiconductor manufacturing also requires processes such as oxidations, nitridization, or chemical vapor depositions. When these processes are conducted in a rapid thermal mode, with high ramp-up rates, short durations at processing temperature, and high ramp-down rates, they are considered rapid thermal processes (RTP). Temperature calibration of these systems is important because the reaction rates of these oxidation, nitridization, and chemical vapor deposition processes are often strong functions of temperature. Flowing of the reaction gases used in these processes would generally interfere with the operation of the invention described herein. However, using the present invention to calibrate temperature in an RTP system which is flowing only inert gases, such as argon and nitrogen, will allow the temperature of that system to be accurately calibrated. Then, subsequent processing with reaction gases flowing would be conducted in a system with well calibrated temperature. Thus, the performance of the RTP system would be improved.

Further features and advantages of the invention will be readily apparent from the specification and from the drawings.

DETAILED DESCRIPTION OF THE INVENTION

Figure 1:
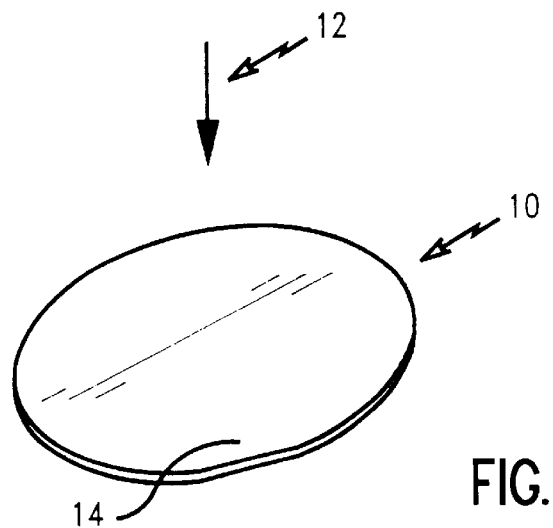
FIG. 1 is a perspective view schematically illustrating the annealing of a semiconductor device wafer including a resistor for temperature measurement in accordance with the invention.

Referring to FIG. 1, a wafer 10 used in the fabrication process of semiconductor devices is illustrated. The wafer 10 is subject to a rapid thermal anneal (RTA), represented by an arrow 12, in a temperature range around 900° C., for example, 900° C.–940° C. The present invention relates to a method of measuring the temperature of momentary anneals in this temperature range for use in tool calibration. The wafer 10 is fabricated to include one or more resistors 14 for use in the measurement process. The resistor 14 could be located anywhere on the wafer 10 for measuring the anneal temperature. As is apparent, the wafer 10 will have undergone various steps of the fabrication process for forming semiconductor devices in other portions of the wafer 10. Alternatively, the resistor could be constructed separately for temperature measurement using non-production wafers.

Figure 2:
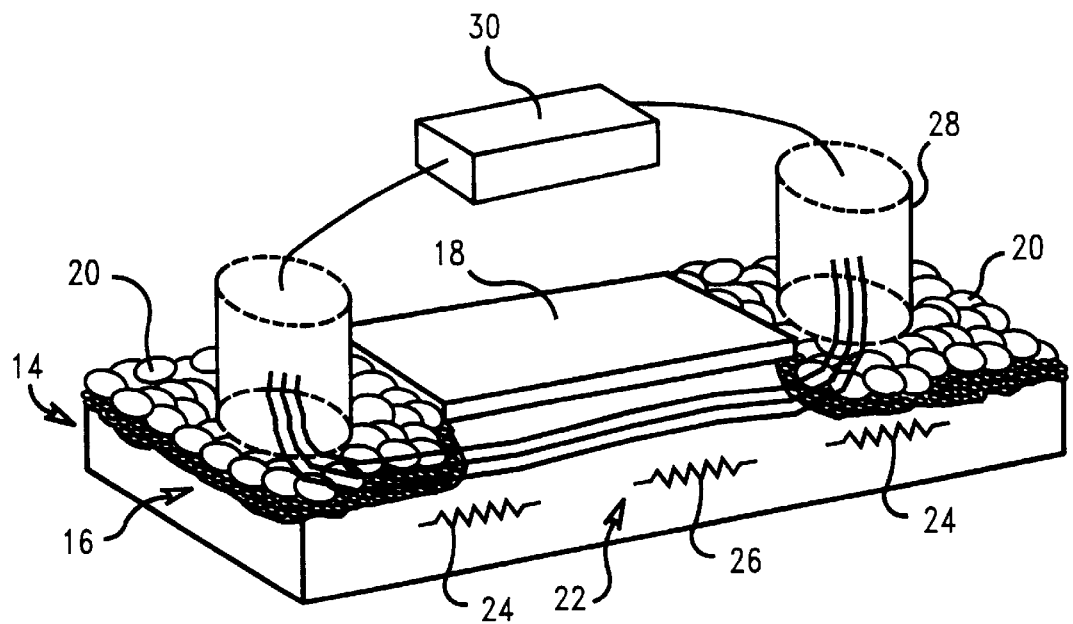
FIG. 2 is a partial perspective view in detail of the resistor illustrating measurement of interfacial resistance subsequent to the annealing of FIG. 1.

Referring to FIG. 2, the resistor 14 according to the invention is illustrated in greater detail. The resistor 14 includes a substrate 16. The substrate 16 consists of doped polysilicon or single crystal silicon. A blocking layer 18 is formed on the substrate 16. Titanium silicide ($TiSi_2$) contacts 20 are formed on the substrate 16 at opposite ends of the blocking layer 18. The blocking layer 18 prevents a bulk region 22 of the substrate 16 from being silicided.

During the RTA process, illustrated in FIG. 1, boron from the substrate 16 segregates into the titanium silicide. The dopant depletion at the interface between the silicide and the doped silicon creates a highly resistive region. The resistance of the silicide substrate interface is referred to as "end-resistance" and is represented by resistors 24 in FIG. 2. The bulk resistance is represented by a resistor 26. The end-resistance 24 is very sensitive to the temperature of the momentary anneal. In fact, it has been found that there is an approximately 80% change over a 20° C. temperature range. This 80% change is a factor of 2.7 improvement over the sensitivity of boron implanted monitor wafers. Thus, in accordance with the invention, the end-resistance 24 can itself be used as a temperature monitor.

In order to measure resistance, electrical conductors 28 are secured to the silicide contacts 20 and connected to a resistance measuring device 30. The conductors 28 are used solely to contact the silicide contacts 20. They may be secured by any known method for forming electrical contacts. The total resistance of the structure is the sum of the bulk resistance 26, the two end-resistances 24, the silicide contacts 20, and the conductors 28. The resistance of the silicide contacts 20 and the conductors 28, however, are small compared to the bulk resistance 26 and the end-resistances 24. They can therefore be neglected. The values of the bulk resistance 26 and end-resistances 24 are extracted from scaling resistors in a conventional manner. Two or more scaling resistors which have the same width but differ in length are used to determine the values of the bulk resistance 26 and the end-resistances 24 independently.

The bulk resistance 26 depends on active doping concentration in the substrate. The end-resistances 24 depend on resistance changes due to dopant segregation.

Figure 3:
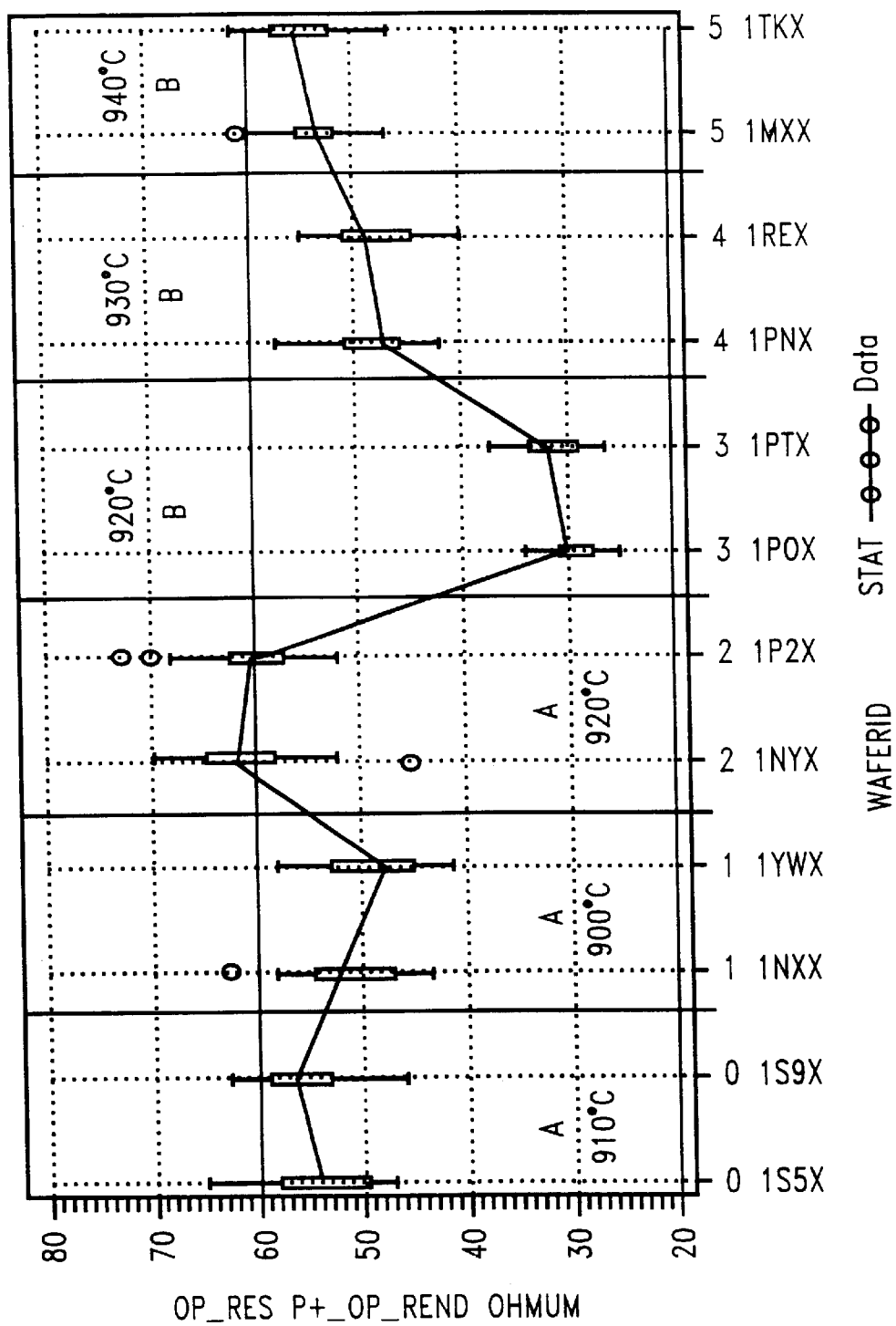
FIG. 3 is a graphical representation of test results illustrating the method according to the invention.

Referring to FIG. 3, a series of curves illustrate end resistance parameters from test results. The horizontal axis identifies wafer IDs used in the test. The vertical axis represents the end-resistance for a resistor with P-type doping. The tests were performed on two separate tools. The first is labeled A, and the second is labeled B. The tests on tool A were performed at 900° C., 910° C. and 920° C. The tests using tool B were performed at 920° C., 930° C. and 940° C. As is apparent from the curves, the technique is sensitive to small temperature changes in this range. For example, with tool B, the end resistance value changes by a factor of approximately 80% over a temperature range of twenty degrees.

In the illustrated embodiment of FIG. 2, the blocking layer 18 is illustrated as rectangular. The shape of the blocking layer 18 could be other than rectangular. The ultimate shape and dimensions of the resistor 14 would depend on the area in which the blocking layer 18 is applied. The process uses self-aligned silicide, otherwise known as salicide. The blocking layer 18 prevents the salicide reaction from occurring in the area in which it is applied. Thus, it selectively blocks the forming of silicide.

Thus, in accordance with the invention, there is illustrated a novel method for temperature measurement using dopant segregation into titanium silicide.

We claim:

1. A method of measuring temperature of momentary anneals in the temperature range around 900° C., comprising the steps of:

providing a substrate of doped polysilicon or single crystal silicon;

applying a blocking layer on a portion of the substrate;

selectively forming silicide on the substrate adjacent opposite ends of the blocking layer to define a resistor;

subjecting the resistor to a momentary anneal in the temperature range around 900° C.; and measuring interfacial resistance between the silicide and the substrate after the annealing step, the resistance being correlated to anneal temperature.

2. The method of claim 1 wherein the blocking layer step comprises applying a layer of dielectric material.

3. The method of claim 1 wherein the blocking layer step comprises applying a layer of silicon nitride.

4. The method of claim 1 wherein the substrate is doped with boron.

5. The method of claim 1 wherein the silicide is $TiSi_2$.

6. The method of claim 1 wherein the measuring step comprises measuring interfacial resistance, resistance of the silicide and resistance of the substrate.

7. The method of claim 6 wherein the measuring step comprises neglecting resistance of the silicide.

8. The method of claim 1 wherein the measuring step comprises measuring resistance using scaling resistors.

9. A method of measuring temperature of RTA anneals in the temperature range around 900° C., comprising the steps of:

providing a substrate of doped polysilicon or single crystal silicon;

applying a blocking layer on the substrate;

selectively forming silicide on the substrate adjacent opposite ends of the blocking layer to define a resistor;

subjecting the resistor to a momentary anneal in the temperature range around 900° C.;

forming a pair of electrical contacts on the silicide; and measuring interfacial resistance between the silicide and the substrate after the annealing step, the resistance correlating to anneal temperature.

10. The method of claim 9 wherein the blocking layer step comprises applying a layer of dielectric material.

11. The method of claim 9 wherein the blocking layer step comprises applying a layer of silicon nitride.

12. The method of claim 9 wherein the substrate is doped with boron.

13. The method of claim 9 wherein the silicide is $TiSi_2$.

14. The method of claim 9 wherein the measuring step comprises measuring interfacial resistance, resistance of the silicide, resistance of the substrate and resistance of the contacts.

15. The method of claim 14 wherein the measuring step comprises neglecting resistance of the silicide, and the contacts.

16. The method of claim 9 wherein the measuring step comprises measuring resistance using scaling resistors.

* * * * *